US012207040B2

(12) United States Patent
Cochran et al.

(10) Patent No.: US 12,207,040 B2
(45) **Date of Patent: *Jan. 21, 2025**

(54) HEADSET WITH FORCE ISOLATION

(71) Applicant: Voyetra Turtle Beach, Inc., White Plains, NY (US)

(72) Inventors: Scot Cochran, San Diego, CA (US); Tim Wiley, San Diego, CA (US); Andy Logan, Newbury Park, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,523

(22) Filed: Oct. 24, 2023

(65) Prior Publication Data

US 2024/0056722 A1 Feb. 15, 2024

Related U.S. Application Data

(63) Continuation of application No. 17/575,850, filed on Jan. 14, 2022, now Pat. No. 11,805,355, which is a (Continued)

(51) Int. Cl.
*H04R 1/10* (2006.01)
*H04R 5/033* (2006.01)

(52) U.S. Cl.
CPC ......... *H04R 1/1091* (2013.01); *H04R 5/0335* (2013.01)

(58) Field of Classification Search
CPC .... H04R 5/0335; H04R 1/1066; H04R 1/105; H04R 1/10; H04R 1/1041; H04R 1/1058; H04M 1/05; Y10T 24/13

(Continued)

(56) References Cited

U.S. PATENT DOCUMENTS 5,068,923 A * 12/1991 Sjoqvist .................. A61F 11/14 181/129
5,708,725 A 1/1998 Ito (Continued)

FOREIGN PATENT DOCUMENTS

WO 8910107 A1 11/1989

OTHER PUBLICATIONS

Oficial Action for EP Application 16167050.0-1210, mail date Nov. 28, 2018 (6 pages).

(Continued)

*Primary Examiner* — Norman Yu
(74) *Attorney, Agent, or Firm* — McAndrews, Held & Malloy, Ltd.

(57) ABSTRACT

A method and system is disclosed for a headset with force isolation, where the headset comprises a headband having two upper headband sections coupled by a center block and two ear cups, where each ear cup is coupled to one of the two upper headband sections. The two upper headband sections may include side support strips between which a movable strip may be placed, thereby increasing the rigidness of the headband when fully extended between the side support strips. The rigidness of the headband may decrease when the movable strips are retracted from between the side support strips and into the center block utilizing a slider knob. The side support strips may be plastic and the movable strip may be metal. The center block may be more rigid than the side support strips. The center block may be plastic. The headband may include headband endcaps at lower ends of the headband.

20 Claims, 7 Drawing Sheets

Related U.S. Application Data continuation of application No. 17/002,022, filed on Aug. 25, 2020, now Pat. No. 11,240,589, which is a continuation of application No. 16/414,464, filed on May 16, 2019, now Pat. No. 10,764,674, which is a continuation of application No. 15/650,377, filed on Jul. 14, 2017, now Pat. No. 10,299,028, which is a continuation of application No. 14/800,599, filed on Jul. 15, 2015, now Pat. No. 9,712,909.

(58) Field of Classification Search
USPC .................. 381/379, 370, 378, 374, 376, 72
See application file for complete search history.

(56) References Cited

U.S. PATENT DOCUMENTS

| | | | |
|---|---|---|---|
| 9,712,909 B2 | 7/2017 | Cochran | |
| 10,299,028 B2 | 5/2019 | Cochran | |
| 10,764,674 B2 | 9/2020 | Cochran | |
| 2008/0037816 A1 | 2/2008 | Lee | |
| 2014/0023222 A1* | 1/2014 | Ito | H04R 1/105 381/379 |
| 2014/0263493 A1 | 9/2014 | Amurgis | |

OTHER PUBLICATIONS

Official Action for EP Application 16167050.0-1210, mail date Jul. 30, 2019 (5 pages).
Official Action for EP Application, Intention to Grant for EP Application No. 16167050.0-1210, mail date Apr. 1, 2020 (28 pages).
European Patent Office, Communication with Extended Search Report in Application No. 16167050.0 dated Jul. 15, 2016 (8 pages).
European Patent Office, Communication with Extended Search Report in Application No. 20189255.1 dated Sep. 25, 2020 (8 pages).

* cited by examiner

HEADSET WITH FORCE ISOLATION

CLAIM OF PRIORITY

The present application is a continuation of U.S. application Ser. No. 17/575,850, filed Jan. 14, 2022, which is a continuation of U.S. application Ser. No. 17/002,022, filed Aug. 25, 2020, now U.S. Pat. No. 11,240,589, which is a continuation of U.S. application Ser. No. 16/414,464, filed May 16, 2019, now U.S. Pat. No. 10,764,674, which is a continuation of U.S. application Ser. No. 15/650,377, filed Jul. 14, 2017, now U.S. Pat. No. 10,299,028, which is a continuation of U.S. application Ser. No. 14/800,599, filed Jul. 15, 2015, now U.S. Pat. No. 9,712,909. The aforementioned documents are hereby incorporated herein by reference in their entirety.

INCORPORATION BY REFERENCE

N/A

TECHNICAL FIELD

Aspects of the present application relate to audio headsets, and more specifically, to methods and systems for a headset with force isolation.

BACKGROUND

Limitations and disadvantages of conventional approaches to adjustable headsets will become apparent to one of skill in the art, through comparison of such approaches with some aspects of the present method and system set forth in the remainder of this disclosure with reference to the drawings.

BRIEF SUMMARY

Methods and systems are provided for a headset with force isolation, substantially as illustrated by and/or described in connection with at least one of the figures, as set forth more completely in the claims.

DETAILED DESCRIPTION

Certain aspects of the disclosure may be found in a headset with force isolation. Example aspects of the disclosure may include a headset comprising a headband having two upper headband sections coupled by a center block and two ear cups, where each ear cup is coupled to one of the two upper headband sections. Each of the two upper headband sections may comprise side support strips between which a movable strip may be operably placed utilizing a slider knob. The movable strips may provide increased rigidness for the headband when they are fully extended between the side support strips utilizing the slider knob. The rigidness of the headband may decrease when the movable strips are retracted from between the side support strips and into the center block utilizing the slider knob. The side support strips may comprise plastic and the movable strip may comprise metal. The center block may be more rigid than the side support strips. The center block may comprise plastic. The headband may comprise headband endcaps at lower ends of the headband. The slider knobs may be operably configured at positions between the center block and the headband endcaps. The ear cups may be coupled to the upper headband sections via headband slides that are coupled to the headband end caps.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

Figure 1:
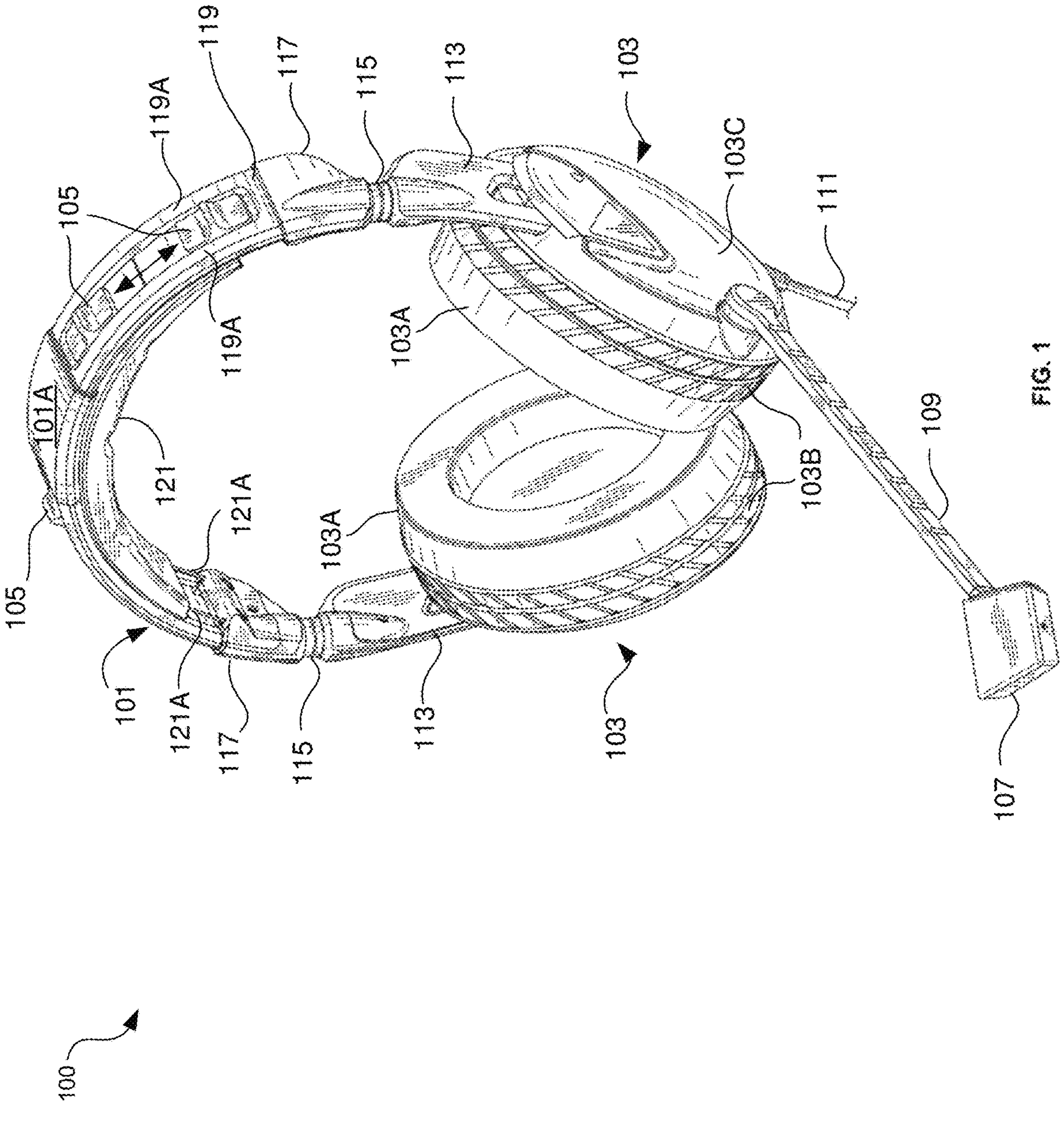
FIG. 1 depicts an oblique view of an example headset, in accordance with an embodiment of the disclosure.

FIG. 1 depicts an oblique view of an example headset, in accordance with an embodiment of the disclosure. Referring to FIG. 1, there is shown a headset 100 with headband 101 and ear cups 103. There are also shown a microphone 107, a microphone boom arm 109, a line-in cable 111, headband slides 113, headband pivots 115, headband endcaps 117, an upper headband 119, and a floating headband 121. The headset 100 may be utilized for gaming, phone, or audio playback purposes, for example. In an example scenario, the headset 100 comprises a powered headset. In another example scenario, the headset 100 comprises a passive headset.

The headband pivots 115 couple the headband slides 113 to the headband endcaps 117, and provide rotational control for the ear cups 103. The microphone 107 provides electrical signals proportional to sound waves detected and may comprise a directional microphone for picking up audio signals from the user while sensing reduced background noise or sound from other sources, for example. The boom arm 109 provides a rigid support for the microphone 107, enabling an optimal position in front of the user for sensing sound from the user.

The ear cups 103 may be coupled to the headband 101 via headband slides 113 and to headband endcaps 117 via headband pivots 115. The headband slides may comprise metal or rigid plastic and may comprise a fork structure, where the two tines extend into the ear cups 103 and may have hemispherical ball features thereon that may be slid into detent features in the ear cup 103, thereby providing discrete headset size settings that are held in place utilizing a ball detent structure. This vertical adjustment of the headband slides 113 may comprise a major adjustment of the headset 100. The major adjustment changes the size of the headset 100 as well as the force on the ear.

Minor adjustment of the headset 100 is enabled by the floating headband 121, which may comprise a flexible band with wire segments 121A that extend from the headband endcaps 117 into the floating headband 121 and back down to the headband endcaps 117. The flexibility in the floating headband 121 therefore provides a minor adjustment of the headset 100.

The ear cups 103 may each comprise an ear pad 103A, a gimbal gasket 103B, and an outer shell 103C. The ear pads 103A may comprise pads that provide cushion for the user's ears and also provide adequate seal for the ears to exclude ambient noise. The gimbal gasket 103B may comprise a silicon dust cover, for example, that provides a volume between the ear pad 103A and outer shell 103C, to allow the ear cup 103 to pivot about a gimbal within the ear cup 103.

The force on the ear may be adjusted due to the shape and rigidity of the headband 101 and associated parts, such as the headband slides 113. Extending the length of the arms of the headset by pulling the headband slides out of the ear cups 103 may increase the force on the user's ears, as this decreases the distance between the ear cups 103 when the headset is not placed on a head, so that more force is needed to expand the headset 100 over the user's head. In contrast, the force on the ear may be decreased by reducing the length of the arms of the headset by pushing the headband slides 113 into the ear cups 103.

The upper headband 119 may be coupled to the headband endcaps 117, and slider knobs 105 may be incorporated in the upper headband 119 for adjusting the rigidity of the headband 101. In an example scenario, in the region where the slider knobs 105 are integrated, the upper headband may comprise two strips of support structure 119A, e.g., plastic strips, between which the slider knobs 105 may be actuated. In an example scenario, the support structures 119A may be less rigid than the headband center block 101A and the headband endcaps 117, allowing for a flexibility that may be compensated for utilizing the slider knobs 105.

The two slider knobs 105 shown in the right side of the upper headband 119 merely indicate the full range that the slider knobs 105 may travel. The slider knobs 105 may be coupled to a metal or rigid plastic strip in the upper headband 119. By sliding the slider knobs 105 downward towards the headband endcaps 117, the rigid strip within the strips of support structure of the upper headband 119 may increase the rigidity of the upper headband 119, thereby increasing force of the ear cups 103 against the ears of the user.

As shown further in FIGS. 2-6, the slider knobs 105 may be coupled to metal bands that add rigidity to the headband 101 when extended down to near the headband endcaps 117. The headband 101 may also comprise a headband center block 101A, which may comprise a solid and rigid structure to which the upper headband 119 is coupled, similar to the headband endcaps 117. The headband center block may comprise a rigid plastic, for example. Therefore, force isolation in the headset 100 may be provided by the variable rigidity actuated by the slider knobs 105 in concert with the headband endcaps 117 and headband center block 101A rigid support structures.

Figure 2:
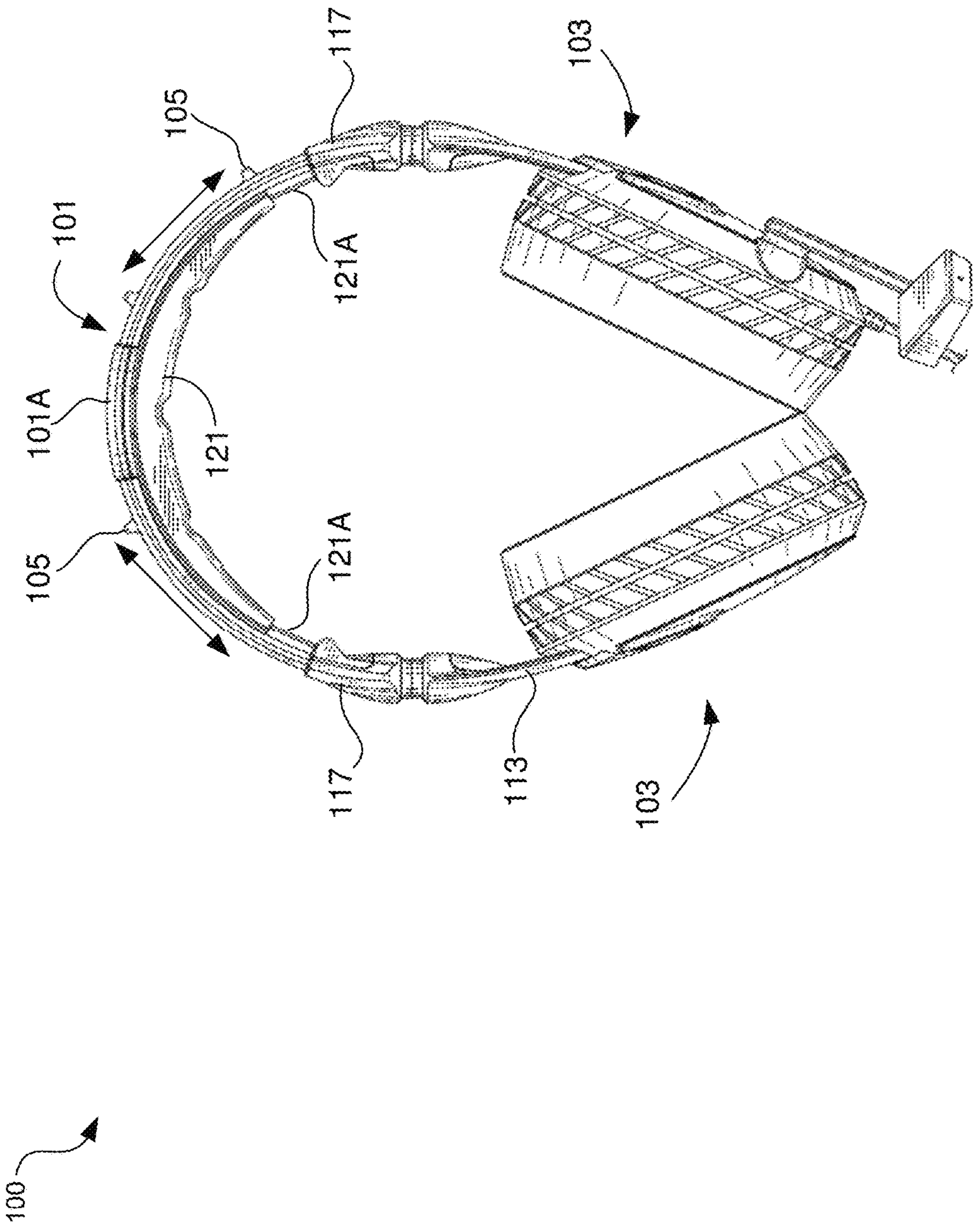
FIG. 2 illustrates a front view of a headset with force isolation, in accordance with an example embodiment of the disclosure.

FIG. 2 illustrates a front view of a headset with force isolation, in accordance with an example embodiment of the disclosure. Referring to FIG. 2, there is shown the headset 100 with elements as described with respect to FIG. 1, for example. The arrows above the headband 101 show the range of travel for the slider knobs 105.

Actuating the slider knobs 105 provides a variable rigidity in the headband 101, as a metal strip attached to each of the slider knobs 105 provides increased rigidity to the headband 101 when slid downward toward the headband endcaps 117 and less rigidity when at the top position adjacent the headband center block 101A. This is shown further with respect to FIGS. 3-7, for example.

Figure 3:
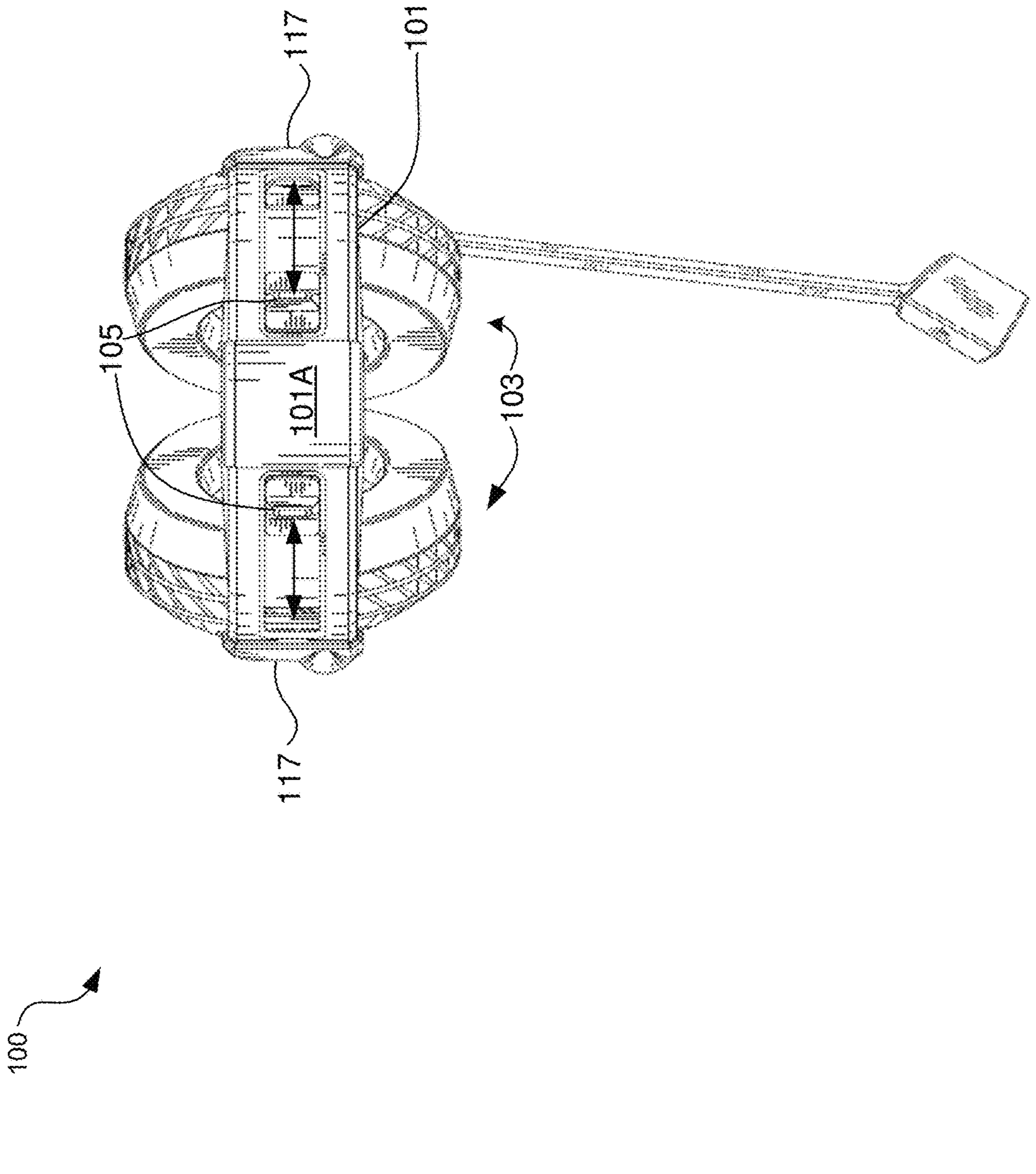
FIG. 3 is a top view of a headset with force isolation, in accordance with an example embodiment of the disclosure.

FIG. 3 is a top view of a headset with force isolation, in accordance with an example embodiment of the disclosure. Referring to FIG. 3, there is shown a top view of the headset 100 with the headband 101, headband center block 101A, ear cups 103, slider knobs 105, and headband endcaps 117. As shown by the arrows, the slider knobs 105 may be actuated from near the headband center block 101 down the headband 101 to the headband endcaps 117, thereby increasing the rigidity of the headband 101.

Figure 4:
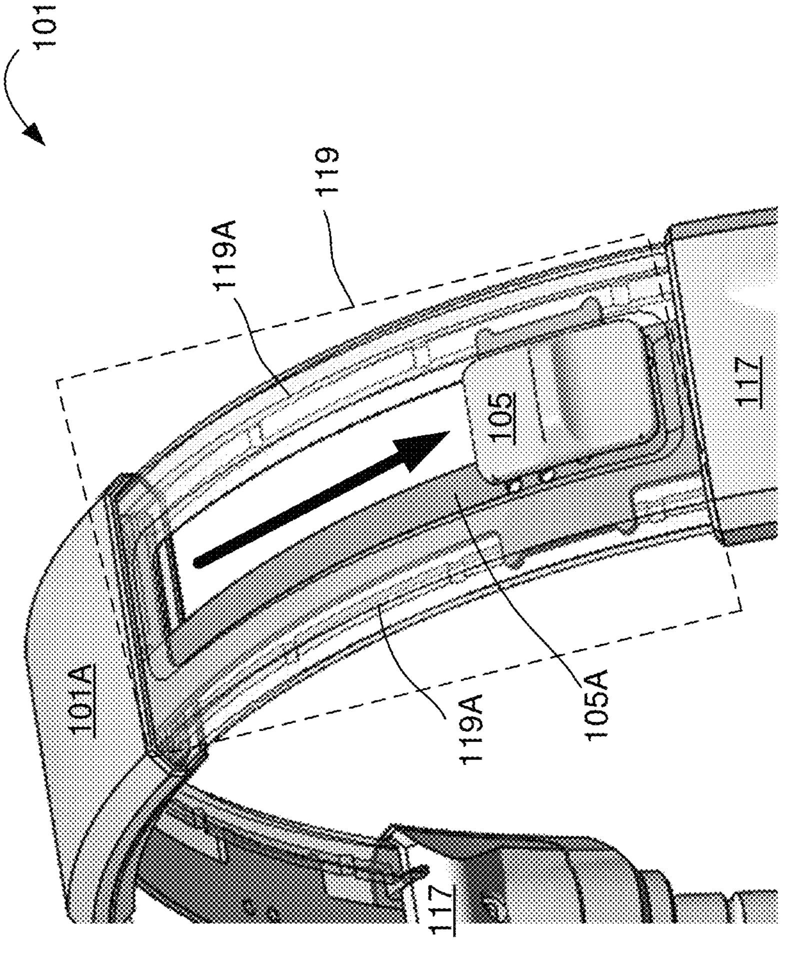
FIG. 4 illustrates an oblique view of a headband slide for force isolation, in accordance with an example embodiment of the disclosure.

FIG. 4 illustrates an oblique view of a headband slide for force isolation, in accordance with an example embodiment of the disclosure. Referring to FIG. 4, there are shown a headset 101 and associated components including the headband center block 101A, headband endcaps 117, slider knobs 105, and upper headband 119. There is also shown a movable strip 105A coupled to the slider knob 105. The movable strip 105A may comprise a rigid material, such as a metal, for example. The upper headband 119 comprises support structure 119A, which may comprise strips of plastic.

The slider knobs 105 are shown in the in the low position in FIG. 4 where the movable strip 105A extends the length between the headband center block 101A and the headband endcaps 117, thereby increasing the rigidity of the headband 101. In instances where the slider knob 105 is at the top near the headband center block 101A, the support structure 119A provides the rigidity for the headband 101, which is less than when the movable strip 105A is extended.

Figure 5:
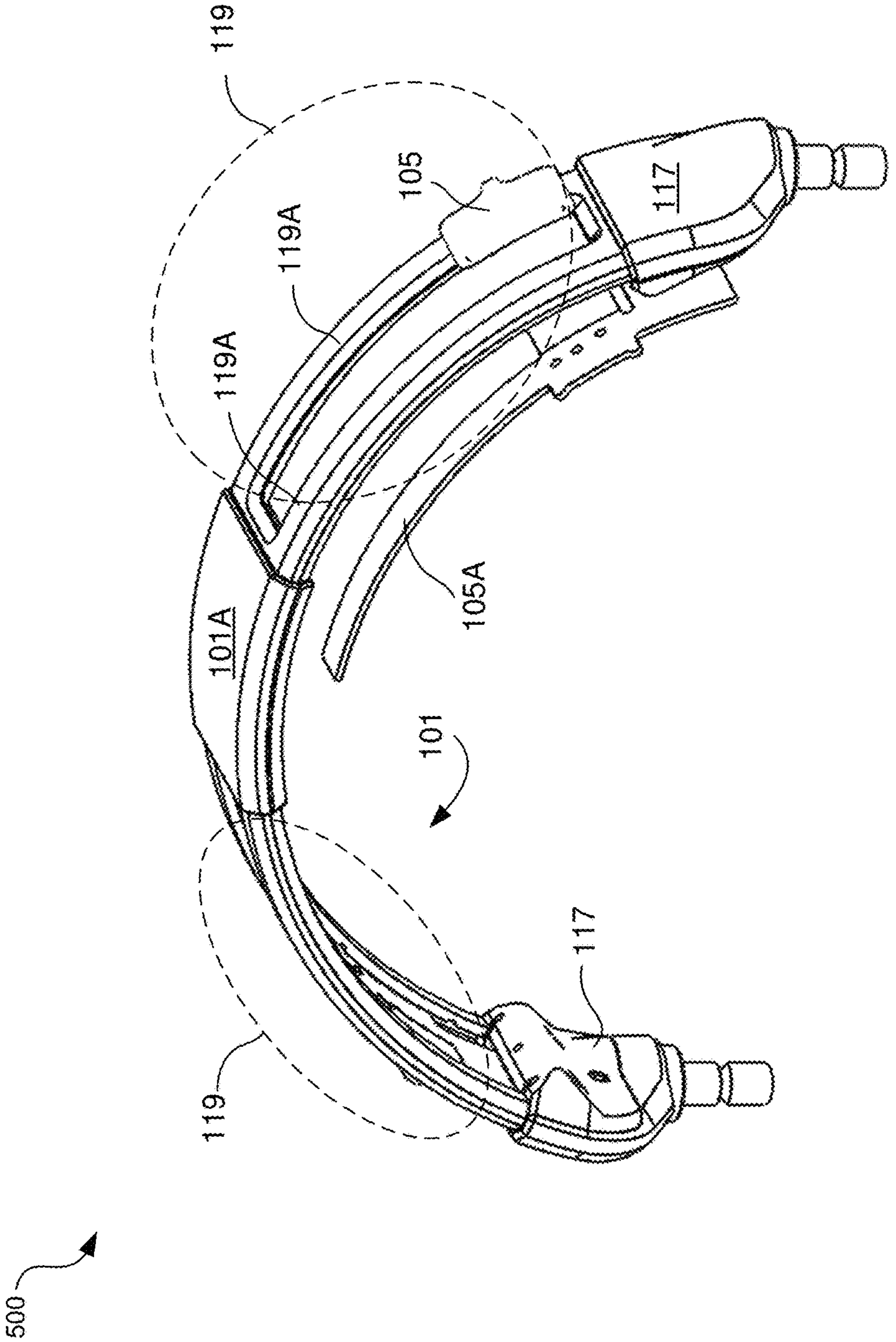
FIG. 5 illustrates a partial exploded view of the headband with force isolation, in accordance with an example embodiment of the disclosure.

FIG. 5 illustrates a partial exploded view of the headband with force isolation, in accordance with an example embodiment of the disclosure. Referring to FIG. 5, there is shown force isolation system 500 comprising the headband 101 and headband endcaps 117. The headband 101 comprises the headband center block 101A and upper headband sections 119, which may comprise support structures 119A. The support structures 119A may comprise semi-rigid material, e.g., plastic, that provides most or all of the rigidity of the headband 101 when the movable strip 105A is retracted.

The movable strip 105A is shown detached from the headband 101 and slider knob 105 for clarity, and illustrates its curved structure enabling it to slide up and down within the headband 101. The movable strip 105A comprises a more rigid structure than the upper headband structures 119, and support structures 119A, such that when it is extended fully it increases the rigidity of the headband 101.

Force isolation of the headset 100 may be provided by a configurable rigidness of the headband 101 between rigid endpoints. The rigid endpoints of the headband 101 may comprise the headband center block 101A and the headband endcaps 117 while the configurable rigidness may be provided by the movable strip 105A and the support structures 119A.

Figure 6:
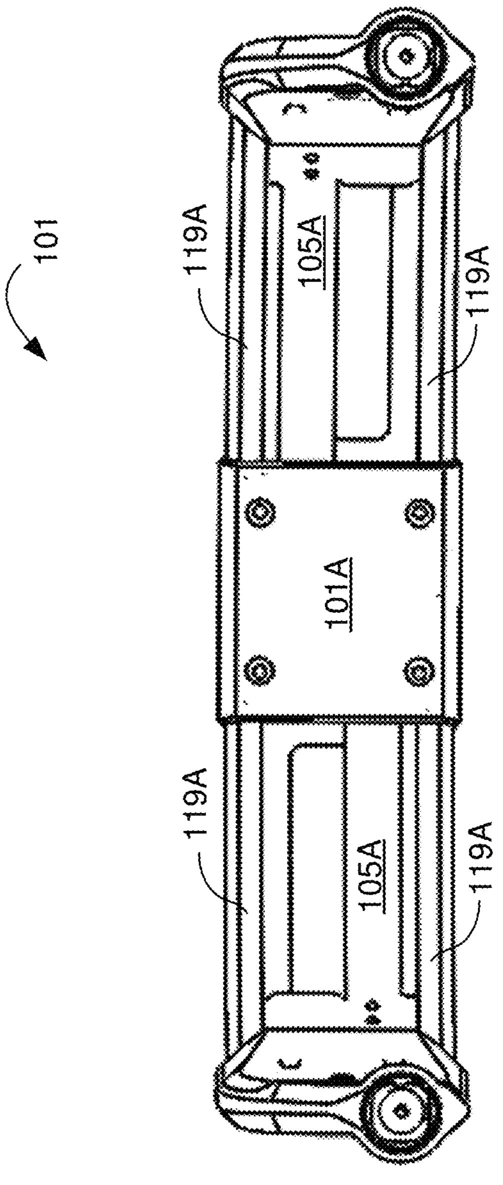
FIG. 6 illustrates a bottom view of the headband, in accordance with an example embodiment of the disclosure.

FIG. 6 illustrates a bottom view of the headband, in accordance with an example embodiment of the disclosure. Referring to FIG. 6, there is shown headband 101 comprising the headband center block 101A and upper headband 119 with support structures 119A. There is also shown the metal strips 105A that may be configured by the slider knobs 105 (not shown in this view) up and down in the upper headband 119 to configure the stiffness of the headband 101.

The metal strips 105A are shown in FIG. 6 in the bottom position, where they are fully extended between the support structures 119A to the headband endcaps 117, adding rigidity and force isolation to the headband 101.

Figure 7:
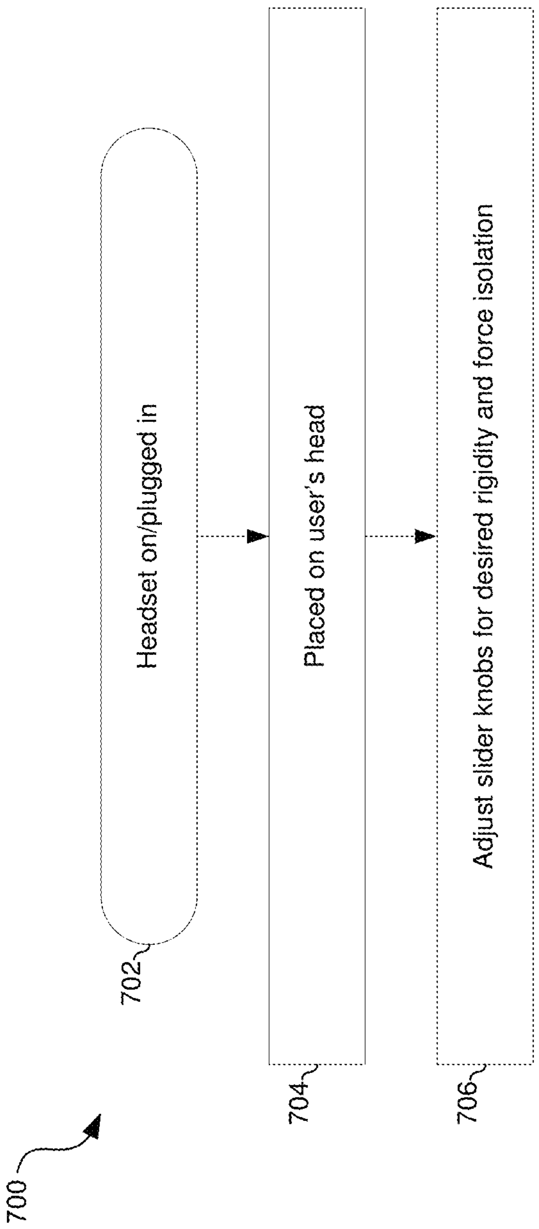
FIG. 7 is a flowchart illustrating an example process for a headset with force isolation.

FIG. 7 is a flowchart illustrating an example process for a headset with an internal gimbal. Referring to FIG. 7, there is shown a flow chart 700, comprising a plurality of example steps. In step 702, the headset 100 may be powered up for gaming, phone, or music playback purposes, where the headset is a powered headset, or may be plugged into a signal source if the headset is a passive headset. In step 704, the headset may be placed on a user's head and in step 706, the slider knobs may be adjusted for desired rigidity and force isolation of the headband.

In an example embodiment of the disclosure a headset with force isolation is disclosed where the headset may comprise a headband having two upper headband sections coupled by a center block and two ear cups, where each ear cup is coupled to one of the two upper headband sections. Each of the two upper headband sections comprise side support strips between which a movable strip may be operably placed utilizing a slider knob. The movable strips may provide increased rigidness for the headband when they are fully extended between the side support strips utilizing the slider knob.

The rigidness of the headband may decrease when the movable strips are retracted from between the side support strips and into the headband center block utilizing the slider knob. The side support strips may comprise plastic and the movable strip may comprise metal. The center block may be more rigid than the side support strips. The center block may comprise plastic. The headband may comprise headband endcaps at lower ends of the headband. The slider knobs may be operably configured at positions between the center block and the headband endcaps. The ear cups may be coupled to the upper headband sections via headband slides that are coupled to the headband end caps.

In another example embodiment, a headset may comprise a headband with two upper headband sections coupled by a center block and two ear cups, where each ear cup is coupled to one of the two upper headband sections. Each of the two upper headband sections comprise flexible side support strips between which a movable rigid strip is operably placed utilizing a slider knob.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system, the system comprising:
- an audio headset comprising a headband, wherein the headband comprises:
  - a side support structure,
  - a center block operably coupled to the side support structure,
  - a movable strip, and
  - a slider knob operable to adjust a placement of the movable strip, wherein:
    - the movable strip is extendable along the side support structure,
    - the movable strip is retractable into the center block, and
    - the movable strip provides a minimum rigidness for the headband when fully retracted into the center block.

2. The system of claim 1, wherein the side support structure is more flexible than the center block.

3. The system of claim 1, wherein the movable strip is more rigid when extended.

4. The system of claim 1, wherein the movable strip provides a maximum rigidness for the headband when fully extended by the slider knob.

5. The system of claim 1, wherein the audio headset comprises two speakers operably coupled to the headband.

6. The system of claim 1, wherein the side support structure comprise plastic and the movable strip comprises metal.

7. The system of claim 1, wherein the center block comprises plastic and is more rigid than the side support structure.

8. The system of claim 1, wherein the headband comprises a headband endcap.

9. The system of claim 8, wherein the slider knob is operably configured at positions between the center block and the headband endcap.

10. The system of claim 8, wherein an ear cup of the one or more ear cups is coupled to the headband via a headband slide that is coupled to the headband end cap.

11. A method, the method comprising:
- moving, via a slider knob, a strip of a headband, wherein:
- the headband comprises a side support structure operably coupled to a center block,
- the strip is extendable along the side support structure,
- the strip is retractable into the center block, and
- the movable strip provides a minimum rigidness for an audio headset when fully retracted into the center block.

12. The method of claim 11, wherein the side support structure is more flexible than the center block.

13. The method of claim 11, wherein the strip is rigid.

14. The method of claim 11, wherein the strip provides a maximum rigidness for the audio headset when fully extended by the slider knob.

15. The method of claim 11, wherein the audio headset comprises two speakers operably coupled to the headband.

16. The method of claim 11, wherein the side support structure comprise plastic and the strip comprises metal.

17. The method of claim 11, wherein the center block comprises plastic and is more rigid than the side support structure.

18. The method of claim 11, wherein the headband comprises a headband endcap.

19. The method of claim 18, wherein the slider knob is operably configured at positions between the center block and the headband endcap.

20. The method of claim 18, wherein an ear cup is coupled to the headband via a headband slide that is coupled to the headband end cap.

* * * * *